(12) United States Patent
Vos et al.

(10) Patent No.: US 11,703,162 B2
(45) Date of Patent: Jul. 18, 2023

(54) PRESS FITTING DEVICE

(71) Applicant: Wavin B.V., Zwolle (NL)

(72) Inventors: Bastiaan Vos, Assen (NL); Gerrit Jan Nijman, Zwolle (NL); Ruurd Johan Berend Van Leeuwen, Utrecht (NL); Marc Herwin De Groot, Zwolle (NL); Ronald Ekkel, Dronten (NL)

(73) Assignee: Wavin B.V., Zwolle (NL)

( * ) Notice: Subject to any disclaimer, the term of this patent is extended or adjusted under 35 U.S.C. 154(b) by 312 days.

(21) Appl. No.: 16/310,755

(22) PCT Filed: Jun. 29, 2017

(86) PCT No.: PCT/EP2017/066140
§ 371 (c)(1),
(2) Date: Dec. 17, 2018

(87) PCT Pub. No.: WO2018/002227
PCT Pub. Date: Jan. 4, 2018

(65) Prior Publication Data
US 2019/0331273 A1    Oct. 31, 2019

(30) Foreign Application Priority Data

Jun. 29, 2016 (NL) ..................... 1041958

(51) Int. Cl.
*F16L 13/14* (2006.01)
*F16L 33/207* (2006.01)
*F16L 37/02* (2006.01)

(52) U.S. Cl.
CPC ........... *F16L 13/148* (2013.01); *F16L 33/207* (2013.01); *F16L 13/141* (2013.01);
(Continued)

(58) Field of Classification Search
CPC ....... F16L 37/02; F16L 2201/30; F16L 11/04; F16L 33/16; F16L 33/18; F16L 33/20;
(Continued)

(56) References Cited

U.S. PATENT DOCUMENTS 1,622,768 A    3/1927  Cook et al.
2,295,510 A    9/1942  Ball et al.
(Continued)

FOREIGN PATENT DOCUMENTS

CH    429 331 A    1/1967
CH    429331 A     1/1967
(Continued)

OTHER PUBLICATIONS

International Search Report and Written Opinion for International Application No. PCT/EP2017/066140, dated Oct. 17, 2017.
(Continued)

*Primary Examiner* — Zachary T Dragicevich
*Assistant Examiner* — William S. Choi
(74) *Attorney, Agent, or Firm* — Wolf, Greenfield & Sacks, P.C.

(57) ABSTRACT

A press fitting device (1) for establishing a fluid-tight connection with at least one pipe section (10), the press fitting device being configured to generate a sound when a gaseous fluid flows along or through the press fitting device a) in a pre-press fit condition, in which a connection with the at least one pipe section is established and before the connection is press-fit; and/or b) in a press fit condition, in which the connection is press-fit, if the connection is not fluid-tight.

12 Claims, 7 Drawing Sheets

(52) U.S. Cl.
CPC ............ *F16L 33/2071* (2013.01); *F16L 37/02* (2013.01); *F16L 2201/10* (2013.01); *F16L 2201/30* (2013.01)

(58) Field of Classification Search
CPC . F16L 33/207; F16L 33/2071; F16L 33/2076; F16L 13/143; F16L 33/2075; F16L 13/141; F16L 13/148; F16L 2201/10
USPC .................. 285/374, 13, 93, 231, 382, 399
See application file for complete search history.

(56) References Cited

U.S. PATENT DOCUMENTS

| | | | |
|---|---|---|---|
| 2,412,394 A | | 12/1946 | Giles |
| 2,453,997 A | * | 11/1948 | MacWilliam ........... F16L 33/18 |
| 2,883,211 A | | 4/1959 | Grass |
| 2,956,820 A | | 10/1960 | De Cenzo |
| 2,971,781 A | | 2/1961 | Torres |
| 3,052,491 A | | 9/1962 | Grass |
| 3,129,021 A | | 4/1964 | Willis et al. |
| 3,237,974 A | * | 3/1966 | Press ................. F16L 33/2073 |
| 3,352,575 A | | 11/1967 | Daspit |
| 3,482,859 A | | 12/1969 | Bowlin |
| 3,495,853 A | | 2/1970 | Furrer |
| 3,507,520 A | | 4/1970 | Guldener et al. |
| 4,103,943 A | | 8/1978 | Curtin |
| 4,159,132 A | | 6/1979 | Hitz |
| 4,265,471 A | | 5/1981 | Nash |
| 4,360,227 A | | 11/1982 | Bridges |
| 4,613,161 A | | 9/1986 | Brisco |
| 4,758,024 A | | 7/1988 | Kaempen |
| 5,266,740 A | | 11/1993 | Hsu |
| 5,332,269 A | | 7/1994 | Homm |
| 5,351,999 A | | 10/1994 | Hattori |
| 5,480,193 A | | 1/1996 | Echols et al. |
| 6,129,107 A | * | 10/2000 | Jackson ......................... 285/13 |
| 6,311,734 B1 | | 11/2001 | Petrovic |
| 9,625,070 B2 | * | 4/2017 | Hegler ............... F16L 33/2071 |
| 2002/0079697 A1 | | 6/2002 | Griffioen et al. |
| 2006/0049631 A1 | | 3/2006 | Tolhoek |
| 2010/0025992 A1 | | 2/2010 | Spence |
| 2010/0308572 A1 | * | 12/2010 | Pedersen |
| 2011/0025045 A1 | * | 2/2011 | Preimesberger ................ 285/93 |
| 2011/0210542 A1 | | 9/2011 | Makselon et al. |
| 2013/0291988 A1 | * | 11/2013 | Hegler ............... F16L 33/2071 |
| 2015/0308594 A1 | | 10/2015 | Hulsebos et al. |
| 2015/0308595 A1 | | 10/2015 | Lee |
| 2017/0274444 A1 | * | 9/2017 | Jeon |
| 2018/0313479 A1 | | 11/2018 | Brinkhuis et al. |

FOREIGN PATENT DOCUMENTS

| | | | | |
|---|---|---|---|---|
| CN | 103988485 A | | 8/2014 | |
| CN | 104455858 A | * | 3/2015 | ............. F16L 33/18 |
| CO | 05096668 | | 4/2006 | |
| DE | 91 13 612 U1 | | 12/1991 | |
| DE | 29515269 U1 | | 11/1995 | |
| DE | 10327503 A1 | | 1/2005 | |
| DE | 20221504 U1 | | 2/2006 | |
| DE | 20 2006 004457 U1 | | 5/2006 | |
| DE | 10 2012 111337 A1 | | 5/2014 | |
| EP | 1 596 116 A1 | | 11/2005 | |
| EP | 1 837 574 A1 | | 9/2007 | |
| EP | 1 882 876 A1 | | 1/2008 | |
| EP | 2 151 616 A2 | | 2/2010 | |
| EP | 2 935 963 A1 | | 10/2015 | |
| FR | 2 490 417 A2 | | 3/1982 | |
| GB | 1 553 995 A | | 10/1979 | |
| JP | H08-285143 A | | 11/1996 | |
| JP | 2012-530232 A | | 11/2012 | |
| JP | 2016-016008 A | | 2/2016 | |
| JP | 2016-065614 A | | 4/2016 | |

OTHER PUBLICATIONS

International Preliminary Report on Patentability for International Application No. PCT/EP2017/066140, dated Jan. 1, 2019.
Office Action for Colombian Application No. NC2018/0004985, dated Aug. 28, 2019.
International Search Report and Written Opinion for International Application No. PCT/EP2016/076123, dated Jan. 24, 2017.
International Preliminary Report on Patentability for International Application No. PCT/EP2016/076123, dated May 11, 2018.
English translation of Office Action for Chinese Application No. CN201780040151.1, dated Mar. 16, 2020.
Office Action for Indian Application No. 201817015797, dated Aug. 19, 2020.
Office Action for Japanese Application No. 2018-567845, dated Jun. 28, 2021.
Office Action for Korean Application No. 10-2019-7000755, dated Jun. 29, 2021.

* cited by examiner

PRESS FITTING DEVICE

RELATED APPLICATIONS

This application is a national stage filing under 35 U.S.C. § 371 of international application number PCT/EP2017/066140, filed Jun. 29, 2017, and claims the benefit of Dutch application number 1041958, filed Jun. 29, 2016, each of which is herein incorporated by reference in its entirety.

BACKGROUND

The present invention relates to a press fitting device for establishing a fluid-tight connection with at least one pipe section, and to a method for identifying a leak in a connection.

Press fit connections are used, for example, to establish fluid-tight connections in pipe systems such as warm or cold water supply systems or heating/cooling systems or for gas systems. Press fit connections are both used to fluid-tightly connect two pipe sections and to connect a pipe section with another component such as a male or female threaded connection piece or a copper connection piece to be soldered to another element.

To form a connection, the press fitting device and any necessary further components are brought into contact with the two pipe section(s) and (possibly) a further component to be connected. This establishes a connection in a pre-press fit condition. A press tool is then used to make a press fit connection which is supposed to be fluid-tight.

However, a lack of fluid tightness and, hence, a leakage in a connection in a pipe system may occur for various reasons.

When a large number of press fit connections are formed in a pipe system, an operator may simply forget to perform the press fitting operation for one (or several) of the connections. Alternatively, a press fitting operation may not be adequately performed due to human error or e.g. due to the presence of a foreign object or substance, such as sand.

To avoid having a fluid (e.g., water) leak out of a connection when the respective pipe system is in use, it is therefore desirable to be able to identify leaky press fit connections (e.g., connections where an operator forgot to perform a press fitting operation). A known method for doing is based on monitoring the pressure of a fluid flowing through the pipe system. When one or several (supposedly adequately press fit) connections in a pipe system have been formed, a fluid such as water, oil-free air, or compressed air is put into the pipe system. The pipe system is then sealed off and the pressure is measured after a predetermined period of time. If the decrease of the pressure of the fluid in the pipe system exceeds a certain threshold after the predetermined period of time, this suggests the presence of at least one leaky connection in the pipe system.

However, carrying out the described pressure monitoring test requires a considerable amount of time. Further, even when a leakage in the pipe system has been determined, additional efforts are required to identify the leaky press fit connection(s). This is inconvenient especially when testing pipe systems with a large number of connections.

There is a need for a press fitting device and a method for identifying a leak in a connection which address at least one of the above mentioned shortcomings.

Embodiments are defined by the claims below.

SUMMARY

One aspect of the present disclosure relates to a press fitting device for establishing a fluid-tight connection with at least one pipe section (a part/section of a pipe). The press fitting device is configured to generate a sound when a gaseous fluid flows along or through the press fitting device a) in a pre-press fit condition, in which a connection with the at least one pipe section is established and before the connection is press-fit; and/or b) in a press fit condition, in which the connection is press-fit, if the connection is not fluid-tight.

The disclosure encompasses embodiments of press fitting devices which only generate a sound when a gaseous fluid is flown through the device in situations in which a press fitting operation was not carried out (i.e., when the connection is still in the pre-press fitting condition) (condition a) mentioned above) and to embodiments wherein a sound is merely generated in situations in which a press fit connection is not fluid-tight (situation b) mentioned above). Further, the disclosure also encompasses embodiments wherein a sound is generated in both situations (both for situations a) and situation b) mentioned above).

Preferably, the press fitting device is configured to establish a fluid-tight connection with two pipe sections, between three pipe sections (e.g., the press fitting device may be a T-piece connector or a part thereof), or between a pipe section and a connection piece such as, e.g., a male or female threaded connection piece or a copper connection pipe for being soldered to another element.

The press fitting device may comprise an outside-facing opening through which a sound can be carried to the outside of a connection. This promotes an easy detection of the sound from the outside.

A connection established with the press fitting device can be efficiently tested for fluid-tightness. To do so, a gaseous fluid may be flowed through the connection. If the press fitting device generates a sound, the connection is not fluid-tight, i.e., it is a leaky connection. This test works both for situations in which a connection was by mistake not press fit and remains in a pre-press-fit condition, and for situations in which a press-fit connection still leaks even though a press fitting operation was carried out. Monitoring whether a press fit connection generates a sound allows very efficiently identifying which press fit connection(s) leak(s) also in a pipe system with a large number of press fit connections.

In addition, the method of monitoring the pressure of a fluid such as water, oil-free air, or compressed air flowing through the pipe system may be advantageously combined with detecting which connection(s) is/are leaky (e.g., because an operator forgot to perform a press fitting operation) using the press fitting device according to the present disclosure based on a generated sound. First, the fluid is introduced into the pipe system, the system is then sealed off and the pressure is measured after a predetermined period of time. If the decrease of the pressure of the fluid in the pipe system exceeds a certain threshold after the predetermined period of time, this suggests the presence of at least one leaky connection in the pipe system. Subsequently, if there is a leaky connection, the operator can find out which one it is by listening for the generated sound.

The press fitting device may consist of a single element. Alternatively, it may comprise two or several separate parts. Each of these parts may be removably or permanently connected to at least another one of said parts.

The press fitting device may be combined with further components such as, e.g., a cap member for receiving a pressure force upon performing a press fitting operation. Alternatively, the press fitting device may comprise all that is needed to establish a press fit connection with a pipe section and a further component, such as another pipe section, without requiring any further elements. The press fitting device does, however, preferably not comprise the pipe section and the further component, such as another pipe section or a connection element, to be fluid-tightly connected. A press fit connection is, thus, preferably established between the press fitting device, a pipe section, the further component and, optionally, further elements to be combined with the press fitting device. Further, the press fitting device may be a radial or an axial press fitting device. In the latter case, the press fitting device may e.g. be placed on a pipe section, the pipe section may be expanded, and the press fitting device brought into position on the expanded section, where a press fitting operation can then be performed.

Preferably, the press fitting device is configured to generate the sound in the form of density fluctuations in the gaseous fluid flowing along or through the press fitting device.

According to some preferred embodiments, the sound comprises or, even more preferably, consists of a whistling sound. In addition thereto or alternatively, the sound may comprise (or consist of) a rattling sound, a squeaking sound, a humming sound, a hissing sound, a rumbling sound, and/or a crackling sound. The skilled person is aware of how to adapt embodiments of the press fitting device so as to switch from any one (or a combination) of the sounds including whistling, rattling, squeaking, humming, hissing, rumbling and crackling, to another one (or a combination) of the mentioned sounds.

More generally, it is preferable for the sound to primarily or even exclusively lie in the human hearing range. Preferably, it comprises one or several frequencies in a range of 16 Hz to 20 kHz, and even more preferably in the range of 30 Hz to 19 kHz. A human can therefore simply hear whether a particular connection generates a sound and, hence, whether it leaks/is not fluid-tight.

According to an embodiment, the press fitting device comprises a fluid vibration member positioned such that a (gaseous) fluid flowing through the press fitting device is incident on the fluid vibration member so that the fluid is caused to vibrate.

The fluid vibration member is preferably itself not, or at least hardly, vibratable by the fluid. The vibrations are thus exclusively, or primarily, exerted onto the (gaseous) fluid through the impingement onto the fluid vibration member and not e.g. by vibrations of the fluid vibration member itself. This allows a very stable and rigid construction of the fluid vibration member as the latter need not be flexible so as to be vibrated itself. Further, the fluid vibration member can either be a separate component or it can be integrally connected with other components of the press fitting device.

Preferably, the press fitting device comprises a fluid guide channel and the fluid vibration member is positioned such that a fluid flowing through the fluid guide channel is incident on the fluid vibration member so that the fluid is caused to vibrate. This is advantageous as the fluid guide channel aims at least a part of the fluid flow towards the fluid vibration member. This promotes the generation of vibrations in the fluid, which in turn promotes the generation of a sound so that the sound is easily detectable.

According to some preferred embodiments, the fluid vibration member is configured to separate the (gaseous) fluid flow into at least two flows when being hit by the (gaseous) fluid. The separation into at least two flows efficiently generates vibrations in the fluid.

The fluid vibration member preferably comprises an edge positioned so as to separate the fluid flow into at least two flows when being the fluid impinges on the edge. The edge is preferably sharp and works as a labium (similar as in a flute). The edge, preferably formed as a labium, generates vortices above and below the edge and thus efficiently promotes the generation of pressure fluctuations in the (gaseous) fluid impinging on the labium.

The fluid vibration member preferably comprises a guide surface along which the fluid is guided, wherein said guide surface comprises a hole with an edge which is configured to separate the (gaseous) fluid flow into at least two flows. Preferably, the edge is sharp so as to efficiently split a fluid flow.

The fluid vibration member is preferably made from one or several rigid materials. The fluid vibration member is, hence, itself not (or hardly) displaceable/vibratable by a fluid flow. In other words, the fluid vibration member is rigid/fixed with respect to at least another part of the press fitting device.

According to some preferred embodiments, the press fitting device comprises a mechanical vibration member which is configured to be vibrated by the gaseous fluid flowing along or through the press fitting device. This is advantageous as the vibrations of the mechanical vibration member in turn generate vibrations of a gaseous fluid flowing along or through the press fitting device. The configuration of the mechanical vibration member to be vibrated is preferably achieved by the mechanical vibration member comprising one or several flexible materials and, hence, being flexible itself, and by positioning it such that a gaseous fluid flowing along or through the press fitting device impinges on the mechanical vibration member so as to generate vibrations.

According to some preferred embodiments, the fluid vibration member is oriented so as to extend in the longitudinal direction (i.e., the axial direction) of a pipe section when connected with the press fitting device. According to another preferred embodiment, the fluid vibration member is oriented so as to extend in a direction perpendicular to the longitudinal direction of a pipe section when connected with the press fitting device, e.g., in a radial direction with respect to the pipe section or in a tangential direction. This is particularly advantageous as the mechanical vibration member is easily vibrated by a fluid flow through a connection involving the press fitting device. The reference to an extension in a particular direction in this paragraph (such as an extension in the longitudinal direction) is to be understood to also encompass some deviations such as an extension in a direction which forms an angle of 15° or smaller (preferably 10° and even more preferably 5°) with respect to the respective direction.

According to an embodiment, the press fitting device comprises at least one sleeve member configured to be at least partially inserted into a pipe section. The mechanical vibration member preferably comprises a surface-shaped element or a rod-shaped element configured to at least partially extend into a gap between the sleeve member and a pipe section when the sleeve member and the pipe section are positioned so as to form a connection, i.e., when the pre-press fit condition is established. Preferably, the mechanical vibration member comprises a straw- or wire-shaped part. It may be entirely or partially straight or have an entirely or partially curved shape.

The mechanical vibration member is preferably at least partially made of a flexible material. Preferably, the flexible material is a synthetic material. The material may comprise (or, preferably, consist of) polyethylene (PE), polypropylene (PP), polyamide (PA), nylon or any combination of two or more of these materials. The choice of any one of these materials is especially advantageous when the mechanical vibration member is a surface- or rod-shaped element.

In a pre-press fit condition, a gaseous fluid may flow through the gap between the sleeve member and a pipe section and vibrate the mechanical vibration member. This in turn leads to fluid vibrations (pressure fluctuations) and, hence, to the generation of a sound. However, when the press fitting operation is adequately performed so as to ensure fluid-tightness, the gap is (at least partially) closed. This can, e.g., be effected in a zone where a sealing ring (e.g., an O-ring) is placed. The mechanical vibration member is then no longer vibrated in the press fit condition. However, if the connection is not fluid-tight in the press fit condition, a fluid may still reach and vibrate the mechanical vibration member. This in turn leads to the generation of a sound.

The mechanical vibration member may be a separate ring-shaped element configured to be attached at one of its axial ends to the sleeve member. For example, the other axial end and, optionally, also at least a part of the section leading up from the other axial end toward the attached axial end may be caused to vibrate. Further, the mechanical vibration may also be a separate, partially ring-shaped element, for example, manufactured by cutting parts out of a ring-shaped element.

The mechanical vibration member is preferably made of a flexible material comprising (or, preferably, consisting of) a thermoplastic elastomer (TPE), for example, TPE-V, TPV, or any combination of two or more of these materials. The choice of any one of these materials is especially advantageous when the mechanical vibration member is a separate ring-shaped element.

According to an embodiment, the mechanical vibration member comprises a flow obstruction element. The flow obstruction element may, for example, be ball-shaped. The flow obstruction element is advantageous as a (gaseous) fluid flow through or along the press fitting device is likely to hit the flow obstruction element. This in turn enhances the generation of vibrations of the mechanical vibration member. The flow obstruction element thus promotes the efficiency of sound generation in the press fitting device.

Preferably, the press fitting device comprises a ring member to be fit to at least one pipe section and a sleeve member for being at least partially inserted into the pipe section such that a fluid passage is formed between the sleeve member and the pipe section in a pre-press fit condition, that is before a press fitting operation is performed to the connection. According to some embodiments, one or several sealing rings may be fit within the space between the sleeve member and the pipe section.

The fluid passage between the sleeve member and the pipe section may be shut off when a press fitting operation is adequately performed. The shutting off may, e.g., be assisted by one or several sealing O-rings.

According to some preferred embodiments, the press fitting device comprises a sleeve member for being at least partially inserted into a pipe section.

Preferably, the press fitting device comprises a cap element configured to be placed around at least one pipe section and to be pressed by a press fitting tool. Preferably, the cap element comprises iron. Further, according to some embodiments, a mechanical vibration member according to any of the embodiments described above or a fluid vibration member according to any one of the embodiments described above may be fully or partially provided in the cap member. For example, the cap member can be provided with a cap (a labium) as described above.

According to some preferred embodiments, the press fitting device is configured to promote an increased volume of generated sound. In other words, if a connection established with the press fitting device is not fluid-tight, fluid leaking out of the connection does not merely create some sound, as a byproduct, associated with a fluid leaking out of a connection, but the generation of sound is consciously promoted. For example, the shape of a part where fluid may leak out of or past the press fitting device is intentionally shaped so as to promote the generation of a particular sound (or a higher volume thereof) when fluid passes. A part of the press fitting device may be moved so as to generate sound itself, and/or a resonance phenomenon associated with a particular shape of the press fitting device may be used to generate/emphasize sound.

Preferably, a leakage-susceptible portion of the press fitting device, where fluid is prone to leak out if the connection is not fluid-tight, is at least partially shaped so as to promote an increased volume of generated sound. The volume is increased as compared to a situation in which the shape for promoting the higher volume of generated sound is absent.

Preferably, the leakage-susceptible part of the press fitting device comprises a flute member, shaped like at least a part of a flute and configured to whistle upon passage of a fluid, and/or a flexible member configured to be moved by passing fluid so as to rattle, squeak, hum, hiss, rumble, and/or crackle.

According to some preferred embodiments, the sound generated by the press fitting device is audible to the human ear, preferably at a distance from the press fitting device of at least half a meter, preferably at least one meter, even more preferably at least two meters. In other words, someone testing a connection can hear whether the connection is fluid-tight simply by listening. A method involving pressure measurements to establish whether connections are fluid-tight, as described in the introduction, may be carried out beforehand, as a coarser test to find out whether there are any leaky connections at all. If there is one or if there are several leaky connection(s), it/they can then be efficiently found by listening for the sound and looking where it comes from.

Preferably, the press fitting device is configured to actively generate a sound when a gaseous fluid flows along or through the press fitting device in a pre-press fit condition, in which a connection with the at least one pipe section is established and before the connection is press-fit; and/or in a press fit condition, in which the connection is press-fit, if the connection is not fluid-tight. The configuration to "actively" generate sound, as opposed to being configured to "passively" generate sound, means that the press fitting device is specifically adapted to generate a sound which is louder than a sound which is merely generated as a by-product upon a fluid leaking out of a press fitting device which is not specifically adapted for sound generation/promotion.

According to some preferred embodiments, the sound which the press fitting device is configured to generate is louder than background noise. The generated sound preferably, at least at times, has, measured at a distance of 1 m from the press fitting, a sound pressure which is at least 10 dB(A) higher than the sound pressure of background noise. Background noise is understood to have a sound pressure of about 60 dB(A).

According to some preferred embodiments, the sound has (at least at certain times) a sound pressure of 70 dB(A) or higher, preferably 73 dB(A) or higher, when measured at a distance of one meter from the press fitting and at an air pressure of 0.2 bar.

According to some preferred embodiments, the sound has (at least at certain times) a sound pressure of 80 dB(A) or higher, preferably 85 dB(A) or, even more preferably 88 dB(A) or higher, when measured at a distance of one meter from the press fitting and at an air pressure of 0.5 bar.

The present disclosure also relates to the use of a press fitting device according to any one or a combination of the embodiments described above for establishing a fluid-tight connection with at least one pipe section.

The disclosure also relates to the use of a press fitting device according to any one or a combination of the embodiments described above for determining whether a connection between the press fitting device and at least one pipe section is fluid-tight.

Further, the disclosure relates to a method for identifying a leak in a pre-press fit or a press fit connection involving at least one pipe section and a press fitting device according to any one or a combination of the previously described embodiments.

The method comprises the steps of establishing a connection with at least one pipe section using the press fitting device; letting a gaseous fluid flow through the connection; and detecting whether a sound is generated by the press fitting device.

Preferably, the method includes the steps of establishing a plurality of connections in a pipe system, each of the connections being established with at least one pipe section using a press fitting device according to any one of the previous claims, respectively; letting a gaseous fluid flow through the pipe system; detecting whether a sound is generated by any of the press fitting devices; and identifying the press fitting device generating the sound.

Preferably, a press fitting operation is performed for one or for a plurality of connections between the step of establishing at least one connection and letting the gaseous fluid flow through the pipe system.

The method is especially suited to identify which connections are not fluid-tight in a pipe system with a large number of connections. The method can be used to identify a connection for which the press fitting operation has been forgotten by mistake. In this case, a sound signal is generated in the pre-press fit condition. Further, the method can also be used to identify leaky press fit connections (in the press fit condition).

Additional advantages and features of the present disclosure, that can be realized on their own or in combination with one or several features discussed above, insofar as the features do not contradict each other, will become apparent from the following description of preferred embodiments.

The description is given with reference to the accompanying drawings, in which:

BRIEF DESCRIPTION OF THE DRAWINGS

In the following description accompanying the various figures, like parts are denoted with like reference signs.

DETAILED DESCRIPTION

Figure 1:
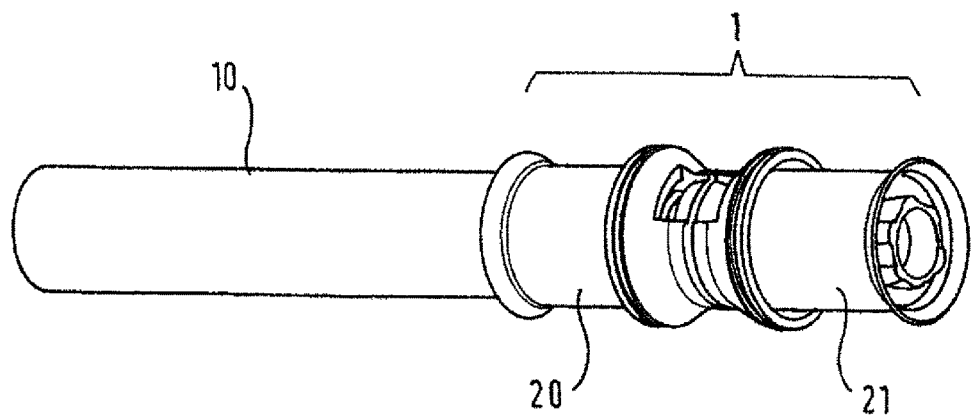
FIG. 1 depicts an embodiment of a press fitting device connected with a pipe section.

FIG. 1 depicts an embodiment of a press fitting device 1 connected to a pipe section 10. This particular embodiment is configured to establish a fluid-tight connection between two pipe sections. However, only one pipe section 10 is illustrated in FIG. 1.

The press fitting device 1 comprises a first cap element 20 and a second cap element 21. The first cap element 20 is placed around a part of the pipe section 10. The second cap element 21 is configured to be placed around a part of a second pipe section (not shown). The first and second cap elements 20, 21 are configured to be pressed by a press fitting tool so as to transform a connection in pre-press fit condition into a press fit connection.

Figure 2:
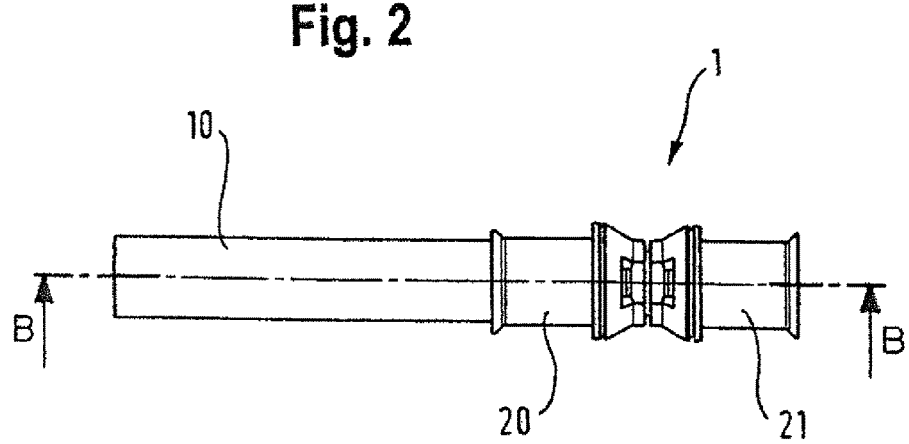
FIG. 2 is a plan view of an embodiment of a press fitting device connected with a pipe section.
Figure 3:
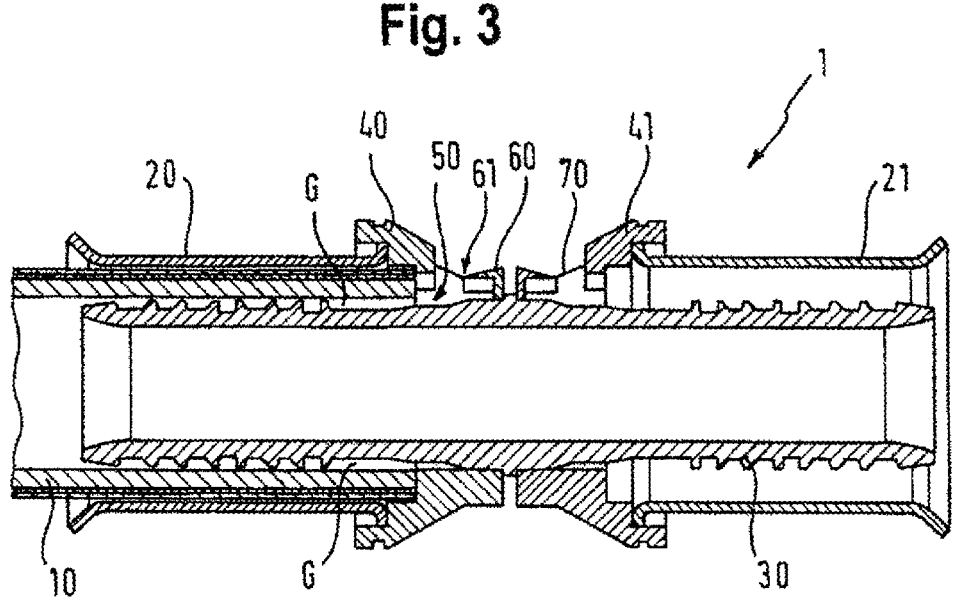
FIG. 3 is a cross-sectional view of an embodiment of a press fitting device fit to a pipe section.

FIG. 2 is a plan view of an embodiment of a press fitting device 1 fit to a pipe section 10, and FIG. 3 depicts a cross-sectional view along the line B-B shown in FIG. 2.

As shown in FIG. 3, this press fitting device 1 comprises a sleeve member 30 which is partially inserted into the pipe section 10 and is also configured to be partially inserted into another pipe section (not shown). However, the disclosure also relates to embodiments of press fitting devices wherein a sleeve member is merely configured to be inserted into a single pipe section. In the case of some embodiments, two separate sleeve members may be provided, wherein each of them is configured to be inserted into a pipe section.

The press fitting device 1 further comprises a first ring member 40 which is fit to the pipe section 10 and a second ring member 41 which is configured to be fit to another pipe section (not shown).

FIG. 3 shows a connection between the press fitting device 1 and the pipe section 10 in a pre-press fit condition, i.e., in a condition before a press fitting tool has been applied to the pressure receiving surface of the cap element 20 so as to press fit the connection.

The press fitting device 1 comprises a sleeve member 30 for being at least partially inserted into a first pipe section 10 and a second pipe section (not shown). The press fitting device 1 further comprises a fluid vibration member 60 comprising an edge 61 and made from a rigid material. In the pre-press fit condition, a small gap G exists between the sleeve member 30 and the pipe section 10. When a gaseous fluid is flown through the connection, for example, from left to right in FIG. 3, then some fluid will flow through the gap G. Some gaseous fluid flowing through the gap G will reach a fluid guide channel 50 and then impinge on the edge 61 of the fluid vibration member 60.

When gaseous fluid (e.g. air) impinges on the edge 61 of the fluid vibration member 60, it is separated into (at least) two flows. This is similar to what happens when air hits the labium of a flute. The splitting of the fluid flow into two flows causes the fluid to vibrate. More specifically, it generates density fluctuations in the gaseous fluid.

In the case of this embodiment, this produces a sound which is carried outside through an outside-facing opening 70 and lies in the bearable range (16 Hz to 20 kHz). This embodiment is in fact designed to produce a whistling sound. Someone can thus easily hear whether this press fitting device 1 is fluid-tightly connected to the pipe section 10 by simply listening whether the press fitting device 1 produces a whistling sound.

FIG. 3 shows the press-fitting device 1 and the pipe section 10 in a pre-press fit condition. However, the press fitting device 1 is also suited to generate a sound after the connection has been press-fit, in case the press fitting operation has not been adequately/fully successfully performed. In other words, if fluid can still leak out of the opening 70, then it will pass through the potentially remaining gap G and thus be vibrated by the fluid vibration member 60 and, hence, generate a sound.

Figure 4:
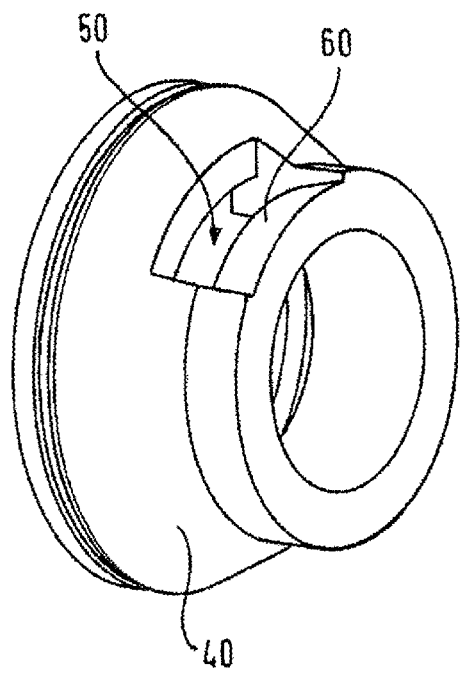
FIG. 4 is a perspective view of a part of a press fitting device.

FIG. 4 is an enlarged perspective view of a part of the press fitting device 1 of FIG. 3. In fact, what is shown in FIG. 4 happens to coincide with a part of the embodiment of a press fitting device shown in FIG. 3. What is shown in FIG. 4 is, however, itself also an example of a press fitting device in the sense of the present disclosure. Such a press fitting device is then used together with further parts such as, e.g., the ones shown in addition to the corresponding part of the press fitting device 1 of FIG. 3.

The part of the press fitting device 1 shown in FIG. 4 comprises a ring member 40. Further, FIG. 4 shows a part of the fluid guide channel 50 and the labium-type fluid vibration member 60.

Figure 5:
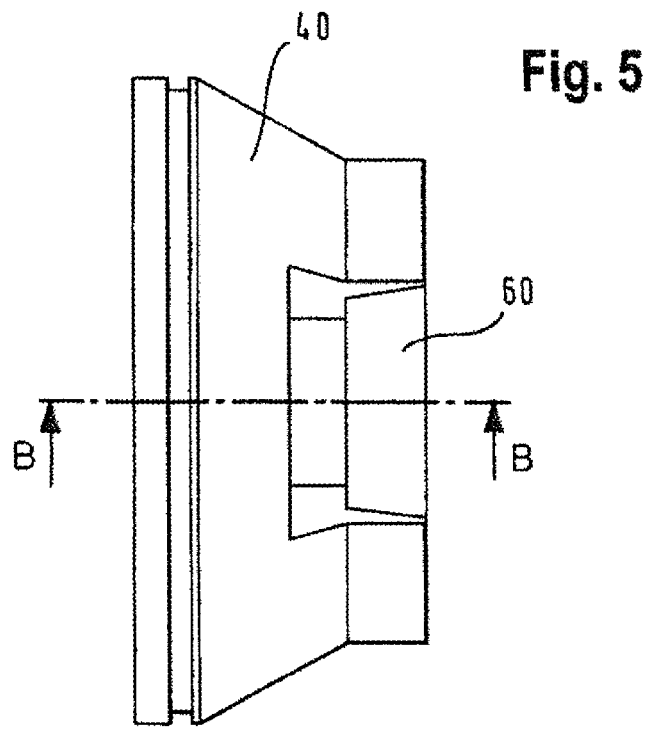
FIG. 5 is a top view of a part of a press fitting device.
Figure 6:
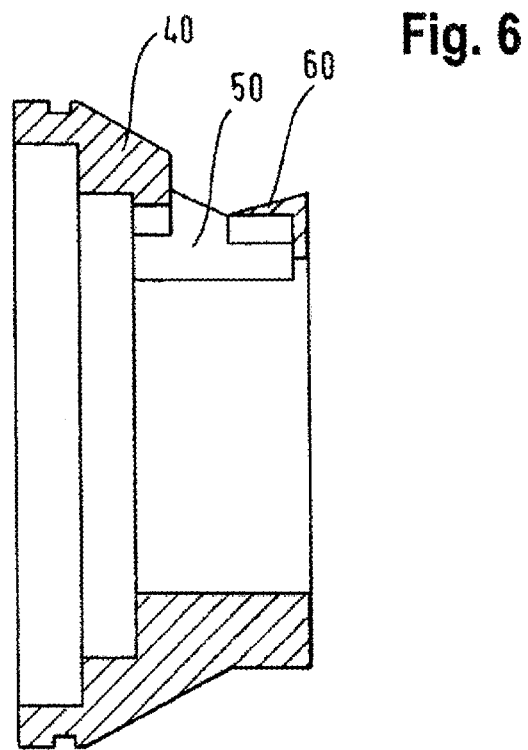
FIG. 6 it a cross-sectional view of a part of a press fitting device.

FIG. 5 is an enlarged top view of the ring member 40 and the fluid vibration member 60, and FIG. 6 is an enlarged cross-sectional view along the line B-B in FIG. 5.

Figure 7:
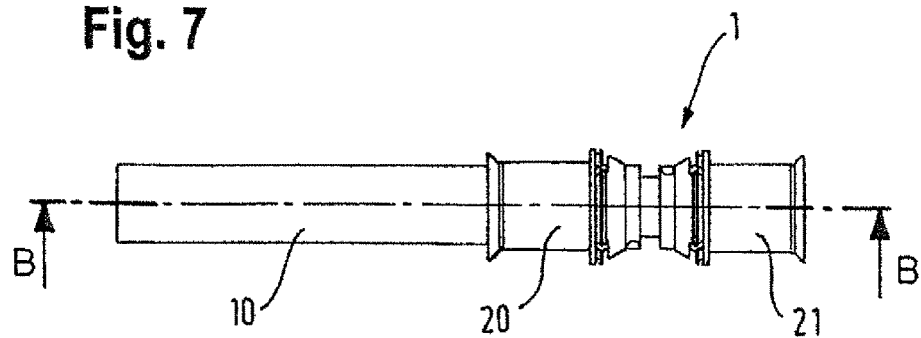
FIG. 7 depicts an embodiment of a press fitting device fit to a pipe section.

FIG. 7 depicts a top view of another embodiment of a press fitting device 1 connected to a pipe piece 10. This particular embodiment is configured to establish a fluid-tight connection between two pipe sections. However, only one pipe section 10 is illustrated in FIG. 7.

The press fitting device 1 of FIG. 7 comprises a first cap element 20 and a second cap element 21 for being connected to a first pipe section 10 and a second pipe section (not shown), respectively.

Figure 8:
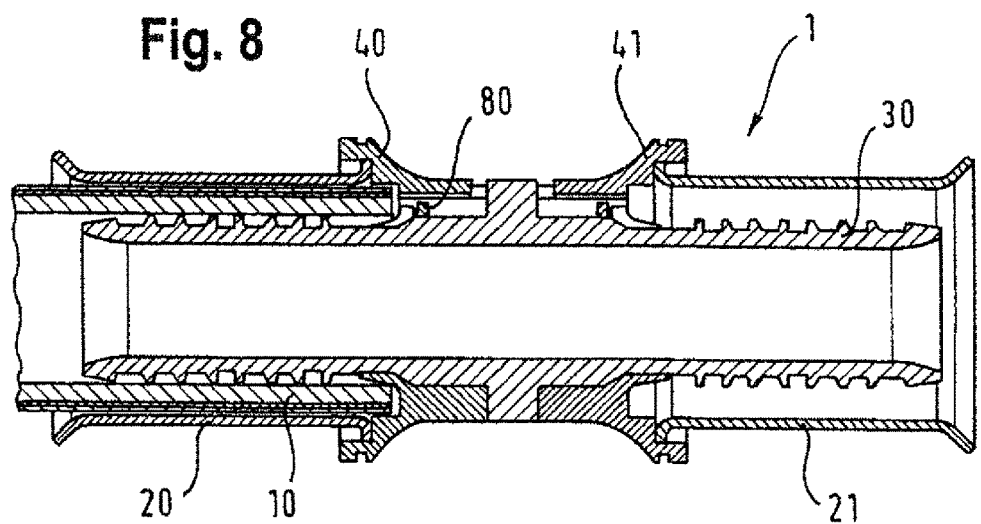
FIG. 8 depicts a cross-sectional view of a press fitting device.

FIG. 8 depicts a cross-sectional view of the press fitting device 1 along the line B-B of FIG. 7. This embodiment of a press fitting device 1 comprises a sleeve member 30 which is partially inserted into the pipe section 10 and is also configured to be partially inserted into another pipe section (not shown).

The press fitting device 1 further comprises a first ring member 40 which is fit to the pipe section 10 and a second ring member 41 which is configured to be fit to another pipe section (not shown).

FIG. 8 shows a connection between the press fitting device 1 and the pipe section 10 in a pre-press fit condition, i.e., in a condition before a press fitting tool has been applied to the pressure receiving surface of the cap element 20 so as to press fit the connection.

The press fitting device 1 comprises a sleeve member 30 for being at least partially inserted into a first pipe section 10 and a second pipe section (not shown).

Figure 9:
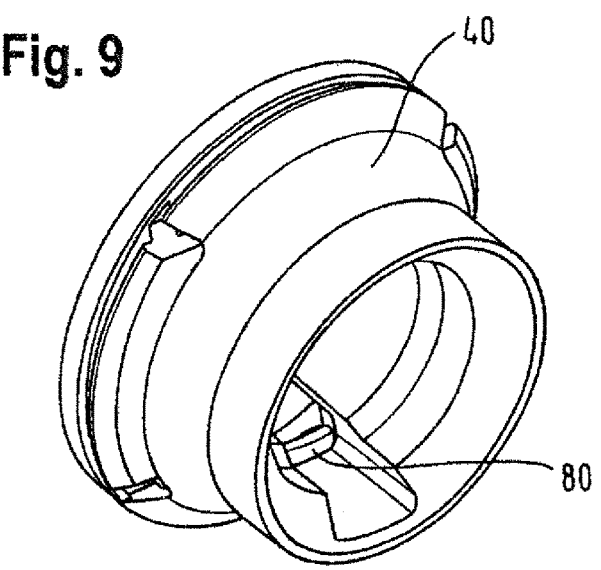
FIG. 9 depicts a perspective view on a part of a press fitting device.

FIG. 9 depicts an enlarged perspective view of a part of the press fitting device 1 of FIG. 8. In particular, FIG. 9 depicts the first ring member 40. Further, FIG. 9 shows that the press fitting device 1 of FIG. 8 comprises a mechanical vibration member 80. The mechanical vibration member 80 is a straw-shaped member oriented in a substantially tangential direction with respect to the ring member 40 and, hence, with respect to the first pipe section 10 when the latter is connected with the press fitting device 1. However, the disclosure also relates to press fitting devices wherein the mechanical vibration member 80 is oriented in an axial or in a radial direction.

The mechanical vibration member 80 is configured to be vibrated by a gaseous fluid flowing through the press fitting device 1. The straw-shaped mechanical vibration member 80 is made of a flexible material such as PE, PP, PA, nylon, or any combination of two or more of these materials.

Because the mechanical vibration member 80 of FIG. 9 is oriented such that a gaseous fluid flow flowing through the press fitting device 1 flows in a direction substantially perpendicular to the longitudinal extension direction of the mechanical vibration member 80, the flow impinges on a long side of the mechanical vibration member 80 and the latter is efficiently made to vibrate. The vibrations of the mechanical vibration member 80 in turn generate vibrations in the fluid and lead to the generation of a sound.

The sound lies in the bearable range (16 Hz to 20 kHz). This embodiment is in fact designed to produce a whistling sound. Someone can thus easily hear whether this press fitting device 1 is fluid-tightly connected to the pipe section 10 by simply listening whether the press fitting device 1 produces a whistling sound.

FIG. 8 shows the press-fitting device 1 and the pipe section 10 in a pre-press fit condition. However, the press fitting device 1 is also suited to generate a sound after the connection has been press-fit, in case the press fitting operation has not been adequately/fully successfully performed. In other words, if fluid can still leak out of the connection, then it will pass through the potentially remaining gap G and thus be vibrated by the mechanical vibration member 60 and, hence, generate a sound.

Figure 10:
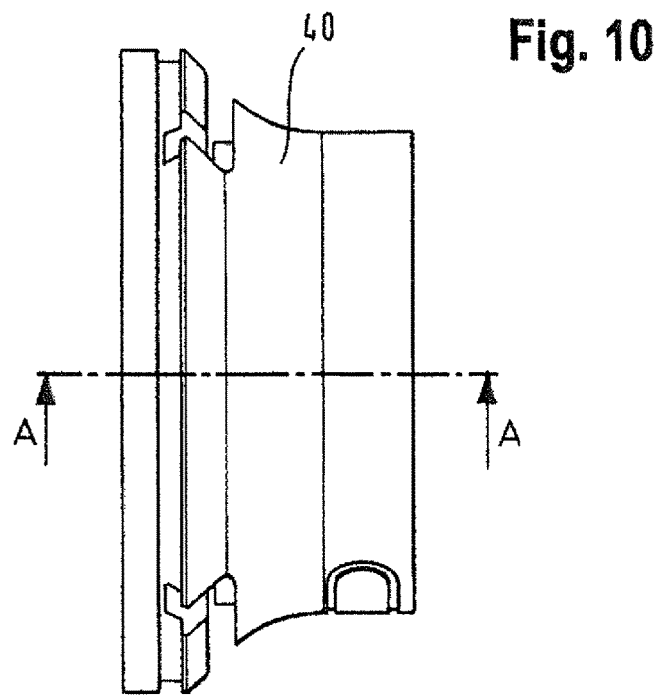
FIG. 10 depicts a top view of a ring member comprising a mechanical vibration member.
Figure 11:
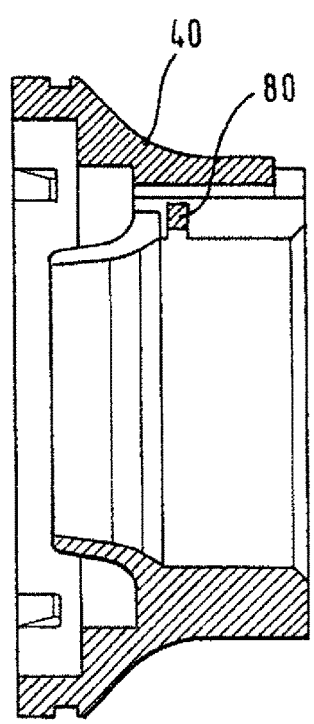
FIG. 11 is a cross-sectional view of a ring member comprising a mechanical vibration member.
Figure 12:
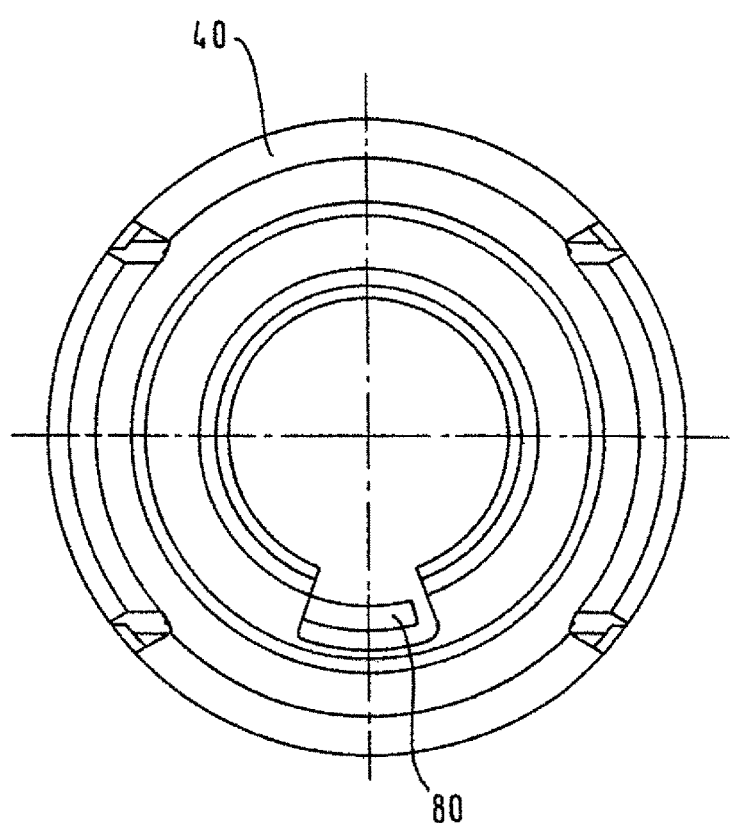
FIG. 12 is a side view of a ring member with a mechanical vibration member.

FIG. 10 is an enlarged top view of the ring member 40 and the mechanical vibration member 80. FIG. 11 is an enlarged cross-sectional view along the line A-A in FIG. 10. FIG. 12 is a side view of the ring member 40 with the mechanical vibration member 80.

Figure 13:
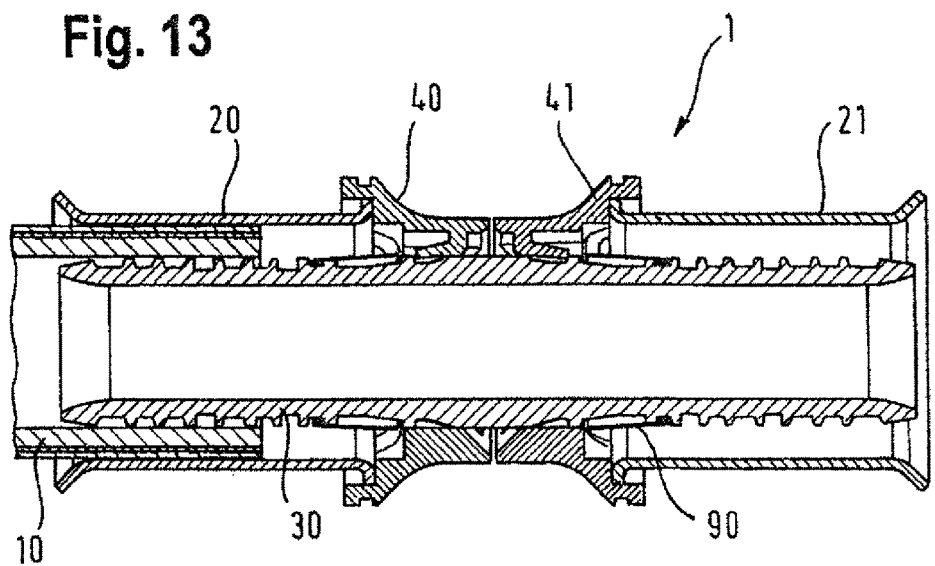
FIG. 13 is a cross-sectional view of an embodiment of a press fitting device fit to a pipe section.

FIG. 13 depicts a cross-sectional view of another embodiment of a press fitting device 1 connected to a pipe piece 10. This particular embodiment is configured to establish a fluid-tight connection between two pipe sections. However, only one pipe section 10 is illustrated in FIG. 13.

The press fitting device 1 of FIG. 13 comprises a first cap element 20 and a second cap element 21 for being connected to a first pipe section 10 and a second pipe section (not shown), respectively. The press fitting device 1 also comprises a sleeve member 30 which is partially inserted into the pipe section 10 and is also configured to be partially inserted into another pipe section (not shown).

The press fitting device 1 further comprises a first ring member 40 which is configured to be fit to the pipe section 10 and a second ring member 41 which is configured to be fit to another pipe section (not shown).

FIG. 13 shows a connection between the press fitting device 1 and the pipe section 10 in a pre-press fit condition, i.e., in a condition before a press fitting tool has been applied to the pressure receiving surface of the cap element 20 so as to press fit the connection.

Figure 14:
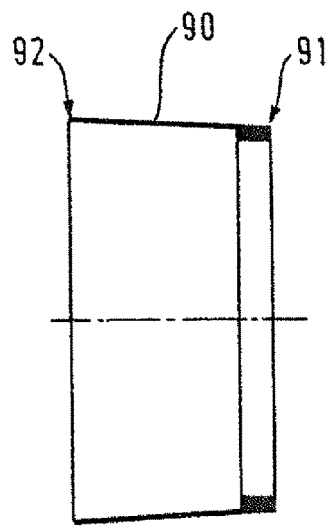
FIG. 14 is a cross-sectional view of a mechanical vibration member as a separate ring element.

The press fitting device 1 of FIG. 13 further comprises a mechanical vibration member 90 in the form of a separate ring-shaped element attached to the sleeve member 30 at its one axial end 91 (see FIG. 14). The other end 92 as well as the part leading up towards the one axial end 91 are flexible and are e.g. vibratable by a gaseous fluid flowing along the press fitting device 1. The straw-shaped mechanical vibration member 90 is made of a flexible material such as TPE, e.g., TPE-V (or TPV).

Figure 15:
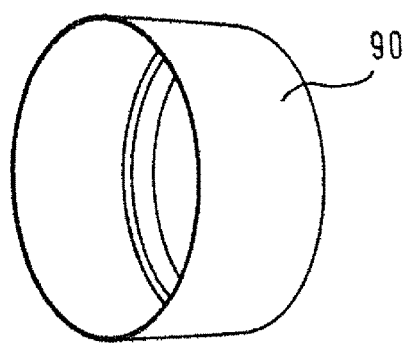
FIG. 15 is a perspective view of a mechanical vibration member as a separate ring element.

FIG. 15 is a perspective view of the mechanical vibration member 90 in the form of a separate ring element.

FIG. 13 shows the press-fitting device 1 and the pipe section 10 in a pre-press fit condition. However, the press fitting device 1 is also suited to generate a sound after the connection has been press-fit, in case the press fitting operation has not been adequately/fully successfully performed. In other words, if fluid can still leak out of the connection, then it will pass through the potentially remaining gap G and thus vibrate the mechanical vibration member 90 which in turn vibrates the fluid, and, hence, generates a sound.

Many additional variations and modifications are possible and are understood to fall within the framework of the invention.

What is claimed is:

1. A press fitting device for establishing a fluid-tight connection with at least one pipe section, the press fitting device comprising:
   at least one cap element positioned around the at least one pipe section;
   at least one ring member overlying at least a portion of the at least one cap element, the at least one ring member configured to generate a sound when a gaseous fluid flows along or through the press fitting device
   a) in a pre-press fit condition, in which a connection with the at least one pipe section is established and before the connection is press-fit; and/or
   b) in a press fit condition, in which the connection is press-fit, if the connection is not fluid-tight; and
   a fluid vibration member formed on the at least one ring member and positioned such that a gaseous fluid flowing through the press fitting device is incident on the fluid vibration member so that the fluid is caused to vibrate;
   wherein the fluid vibration member comprises an edge positioned so as to separate a flow of the fluid into at least two flows when the fluid impinges on the edge, the edge being formed as a labium on the at least one ring member, so that the labium produces the sound.

2. The press fitting device according to claim 1, wherein the press fitting device is configured to generate the sound in the form of density fluctuations in the gaseous fluid flowing along or through the press fitting device.

3. The press fitting device according to claim 1, wherein the sound comprises at least one of a whistling sound, a rattling sound, a squeaking sound, a humming sound, a hissing sound, a rumbling sound, and a crackling sound.

4. The press fitting device according to claim 1, wherein the sound comprises at least one frequency lying in a range of 16 Hz to 20 kHz.

5. The press fitting device according to claim 1, wherein the press fitting device comprises a fluid guide channel and the fluid vibration member is positioned such that a fluid flowing through the fluid guide channel is incident on the fluid vibration member so that the fluid and vibration member is caused to vibrate.

6. The press fitting device according to claim 1, wherein the fluid vibration member is made from a rigid material.

7. The press fitting device according to claim 1, the press fitting device comprising a sleeve member for being at least partially inserted into the at least one pipe section such that a fluid passage is formed between the sleeve member and the at least one pipe section in the pre-press fit condition.

8. The press fitting device according to claim 1, further comprising a sleeve member for being at least partially inserted into a pipe section.

9. The press fitting device according to claim 1, wherein the at least one cap element is configured to be pressed by a press fitting tool.

10. The press fitting device according to claim 1, wherein the sound generated by the press fitting device is audible to a human ear, at a distance from the press fitting device of at least two meters.

11. The press fitting device according to claim 1, wherein the sound is louder than background noise, the sound having a sound pressure which is at least by 10 dB(A) higher than the sound pressure of background noise measured at a distance of 1 meter from the press fitting device.

12. The press fitting device according to claim 1, wherein the sound has a sound pressure of 70 dB(A) or higher, when measured at a distance of one meter from the press fitting device and at an air pressure of 0.2 bar.

* * * * *